United States Patent
Shen et al.

(10) Patent No.: US 11,859,071 B2
(45) Date of Patent: Jan. 2, 2024

(54) CUT RESISTANT AND CREEP RESISTANT UHMWPE FIBER AND PREPARATION METHOD THEREOF

(71) Applicant: JIANGSU JONNYMA NEW MATERIALS CO., LTD., Jiangsu (CN)

(72) Inventors: Wendong Shen, Jiangsu (CN); Qingqing Chen, Jiangsu (CN); Haijian Cao, Jiangsu (CN); Xiaolin Chen, Jiangsu (CN); Junhao Che, Jiangsu (CN); Lingli Zhang, Jiangsu (CN); Xingyin Song, Jiangsu (CN); Feng Yu, Jiangsu (CN); Yafeng Cao, Jiangsu (CN); Chenyu Zhu, Jiangsu (CN)

(73) Assignee: JIANGSU JONNYMA NEW MATERIALS CO., LTD., Jiangsu (CN)

( * ) Notice: Subject to any disclaimer, the term of this patent is extended or adjusted under 35 U.S.C. 154(b) by 614 days.

(21) Appl. No.: 17/042,944

(22) PCT Filed: Jun. 21, 2019

(86) PCT No.: PCT/CN2019/092224
§ 371 (c)(1),
(2) Date: Sep. 29, 2020

(87) PCT Pub. No.: WO2020/177241
PCT Pub. Date: Sep. 10, 2020

(65) Prior Publication Data
US 2021/0032448 A1 Feb. 4, 2021

(30) Foreign Application Priority Data

Mar. 1, 2019 (CN) .......................... 201910154875.X

(51) Int. Cl.
| | |
|---|---|
| *C08L 23/06* | (2006.01) |
| *C08K 3/04* | (2006.01) |
| *C08K 7/10* | (2006.01) |
| *C08K 9/06* | (2006.01) |
| *D01F 1/10* | (2006.01) |
| *D01F 6/46* | (2006.01) |

(52) U.S. Cl.
CPC .............. *C08L 23/06* (2013.01); *C08K 3/042* (2017.05); *C08K 7/10* (2013.01); *C08K 9/06* (2013.01); *D01F 1/10* (2013.01); *D01F 6/46* (2013.01)

(58) Field of Classification Search
CPC ................. C08L 23/06; C08L 2203/12; C08L 2207/068; C08K 3/042; C08K 7/10; C08K 9/06; D01F 1/10; D01F 6/46; D01F 6/04
USPC ......... 428/372; 977/734, 755, 778, 779, 785
See application file for complete search history.

(56) References Cited

FOREIGN PATENT DOCUMENTS

| | | | | |
|---|---|---|---|---|
| CN | 1431342 | 7/2003 | | |
| CN | 106149085 | 11/2016 | | |
| CN | 106222781 | 12/2016 | | |
| CN | 106222781 A | * 12/2016 | ............... | C08K 3/04 |
| CN | 106149085 B | * 10/2018 | ............... | D01D 1/02 |
| CN | 108676291 A | * 10/2018 | ............ | C08J 5/0405 |
| CN | 109824961 | 5/2019 | | |
| WO | 2010079173 | 7/2010 | | |

OTHER PUBLICATIONS

Anmin Huang et al., "Effects of a coupling agent on the mechanical and thermal properties of ultrahigh molecular weight polyethylene/ nano silicon carbide composites", Journal of Applied Polymer Science, Aug. 5, 2013, pp. 1218-1222.
"Search Report of Europe Counterpart Application", dated Jul. 27, 2021, p. 1-p. 8.
"International Search Report (Form PCT/ISA/210) of PCT/CN2019/ 092224," dated Dec. 5, 2019, with English translation thereof, pp. 1-4.

* cited by examiner

*Primary Examiner* — Matthew D Matzek
(74) *Attorney, Agent, or Firm* — JCIP GLOBAL INC.

(57) ABSTRACT

The present invention relates to the field of manufacture of polymer materials, and more particularly to an ultra-high molecular weight polyethylene (UHMWPE) composition and a cut resistant and creep resistant fiber prepared therefrom. The ultra-high molecular weight polyethylene composition comprises the following components: modified graphene, modified silicon carbide whisker, and ultra-high molecular weight polyethylene. The ultra-high molecular weight polyethylene composition provided by the present invention has superior cut resistance, high strength and high modulus. By regulating the morphology of silicon carbide, the type of a coupling agent, the mixing ratio and so on, not only cut resistance, high strength and high modulus can be provided, but also creep resistance can be improved. Meanwhile, adding the coupling agent into the formulation makes silicon carbide being wrapped, so that direct contact with human body can be avoided, thus ensuring safety without toxic side effects while improving product performance.

11 Claims, No Drawings

CUT RESISTANT AND CREEP RESISTANT UHMWPE FIBER AND PREPARATION METHOD THEREOF

CROSS-REFERENCE TO RELATED APPLICATION

This application is a 371 of international application of PCT application serial no. PCT/CN2019/092224, filed on Jun. 21, 2019, which claims the priority benefit of China application no. 201910154875.X, filed on Mar. 1, 2019. The entirety of each of the above mentioned patent applications is hereby incorporated by reference herein and made a part of this specification.

BACKGROUND

Technical Field

The present invention relates to the field of manufacture of polymer materials, and more particularly to a cut resistant and creep resistant UHMWPE fiber and preparation method thereof.

Description of Related Art

Ultra-high molecular weight polyethylene fibers (UHMWPE) refer to those fibers with a molecular weight of 1-6 million, and due to their inner structures with higher crystallinity and stronger intermolecular forces, such fibers possess numerous superior properties, such as, good wear resistance, extremely high impact resistance, good chemical corrosion resistance, higher noise-canceling property, good self-lubrication, low friction coefficient as well as safe-and-sanitary and non-toxic nature, which are referred to as "magic plastics" and widely used in many fields including chemistry, machinery, textile, paper-making, packaging, mining, architecture, sports, military, medical care, and so on.

Ultra-high molecular weight polyethylene is made into high performance fibers by spinning, extracting, drying, and ultra-drawing sequentially. Fiber reinforced composite materials made by ultra-high molecular weight polyethylene have such advantages as light weight and good impact resistance and high dielectric property, and are widely used in fields of aeronautics and astronautics, offshore defense, weaponry and daily industry.

However, during the manufacture and use of existing ultra-high molecular weight polyethylene fibers, as for the properties of materials, most attention is paid to such apparent aspects as tensile strength, tensile modulus and linear density, while less attention is paid to its creep property. This is mainly because such a product is not studied so deeply that effects caused by the creep property has not been investigated which would demonstrate after it has been used for several years. As for an emerging product that has been applied commercially for only about ten years, the significance of the creep property has not been recognized by most producers and users yet.

In fact, the creep property is quite significant for a service life of ultra-high molecular weight polyethylene fibers and articles of manufacture thereof, particularly in some circumstances that forces are required to be applied continuously. One common solution is to modify HMWPE with different fillers, so as to form composite materials, which is one of the inevitable trends in material development.

The present invention provides an inorganic filler for filling into UHMWPE to modify it. Meanwhile, the present invention can improve poor dispersion of the inorganic filler in the case of the ultra-high molecular weight polyethylene having a high viscoelasticity.

SUMMARY

To address the foregoing problems, a first aspect of the present invention provides an ultra-high molecular weight polyethylene composition, comprising the following components: modified graphene, modified silicon carbide whisker, and ultra-high molecular weight polyethylene.

As a preferred technical solution, the modified graphene has a content of 0.5-5 wt % of the ultra-high molecular weight polyethylene.

As a preferred technical solution, the modified silicon carbide whisker has a content of 0.5-5 wt % of the ultra-high molecular weight polyethylene.

As a preferred technical solution, the ultra-high molecular weight polyethylene has a weight-average molecular weight of 2-2.4 million.

As a preferred technical solution, the modified graphene is aminated graphene.

As a preferred technical solution, the aminated graphene includes piperazine modified graphene and octadecylamine modified graphene.

As a preferred technical solution, the modified silicon carbide whisker is silicon carbide whisker modified with a silane coupling agent.

As a preferred technical solution, in the silicon carbide whisker modified with the silane coupling agent, the silicon carbide whisker and the silane coupling agent have a weight ratio of 1:(0.1-0.5).

A second aspect of the present invention provides a cut resistant and creep resistant fiber, which is prepared from the foregoing ultra-high molecular weight polyethylene composition.

A third aspect of the present invention provides a method for preparing a cut resistant and creep resistant fiber, comprising the following steps of:
(1) mixing modified graphene, modified silicon carbide whisker and ultra-high molecular weight polyethylene uniformly;
(2) high-shear stirring the mixture in the step (1) by an emulsifier, to obtain a spinning solution;
(3) spinning the spinning solution, followed by extraction and thermal drawing, to obtain the fiber.

Beneficial Effects: The fiber provided by the present invention has superior cut resistance, high strength and high modulus. By regulating the morphology of silicon carbide, the type of the coupling agent, the mixing ratio and so on, not only cut resistance, high strength and high modulus can be provided, but also creep resistance can be improved. Meanwhile, adding the coupling agent into the formulation makes silicon carbide being wrapped, so that direct contact with human body can be avoided, thus ensuring safety without toxic side effects while improving product performance.

DETAILED DESCRIPTION OF DISCLOSED EMBODIMENTS

The technical features in the technical solutions provided by the present invention are further described hereinafter clearly and thoroughly in conjunction with the Detailed Description, and such a description is not intended to limit the scope of the invention.

The terms "preferred/preferable" and "more preferred/more preferably" and so on as used herein refers to embodiments of the present invention that can provide some beneficial effects in some cases. However, in the same cases or in other cases, other embodiments may also be preferred. Moreover, references to one or more preferred embodiments do not imply that other embodiments are impossible, and are not intended to exclude other embodiments from the scope of the present invention.

When a range of numerical values is disclosed herein, the range is considered as consecutive, and includes minimum and maximum values within the range, as well as each value between the minimum and maximum values. Further, when the range refers to an integer, each integer between the minimum value and the maximum value within the range is included. Furthermore, when multiple ranges are provided to describe a feature or characteristic, these ranges may be combined. In other words, all the ranges disclosed herein should be understood as including any and all of the sub-ranges contained therein, unless otherwise stated. For example, a specified range from "1 to 10" should be considered as including any and all of the sub-ranges between the minimum value of 1 and the maximum value of 10. An exemplary sub-range of a range from "1 to 10" includes, but not limited to, sub-ranges from 1 to 6.1, from 3.5 to 7.8 and from 5.5 to 10, etc.

To address the foregoing problems, a first aspect of the present invention provides an ultra-high molecular weight polyethylene composition, comprising the following components: modified graphene, modified silicon carbide whisker, and ultra-high molecular weight polyethylene.

Graphene

The graphene according to the present invention is a single-atom-layer 2-dimensional crystal connected by $sp^2$ hybridized carbon atoms, with the carbon atoms regularly arranged in cellular lattice structure cells. Each carbon atom connects with other three carbon atoms with σ bond, and additionally, remaining π electrons and π electrons of other carbon atoms form a de-localized and extended π bond, within which the electrons can freely move, thus making the graphene having great electrical conductibility. Meanwhile, such closely-packed cellular structure is a fundamental cell for constructing other carbon materials, so a single-atom-layer graphene can be wrapped to form 0-dimensional fullerene, and a single-layer or multi-layer graphene can be curled to form a single-walled or multi-walled carbon nanotube.

Since each carbon atom in graphene bonds with adjacent three carbon atoms to form a very strong σ bond, graphene also demonstrates superior mechanical property. Recently, scientists from Columbia University utilized an atomic force microscope to measure directly mechanical properties of single-layer graphene, and found that graphene had a Young's modulus of approximately 1100 GPa and a breaking strength of up to 130 GPa, which was 100 times higher than the best steel.

Also, graphene is a good thermal conductor, and has a coefficient of thermal conductivity of up to 5,000 W/(m·K), which is superior to carbon nanotubes, and is even equal to or more than 10 times higher than some common metals, such as, gold, silver, copper, etc.

Several methods for preparing graphene include mechanical exfoliation, epitaxial growth, chemical vapor deposition (CVD), chemical synthesis, graphene oxide reduction, and longitudinally cutting carbon tube, etc.

Mechanical exfoliation: Graphene is separated from graphite by micro-mechanical exfoliation, and another common method for exfoliating graphite is ultrasonic exfoliation of graphite in a liquid phase.

Epitaxy rowth: Si atoms are removed from surfaces of single crystal silicon carbide sheets (SiC) by sublimating at a high temperature (1200 to 1500° C.), thus obtaining epitaxy-grown graphene.

Chemical vapor deposition: Chemical vapor deposition involves decomposing carbon sources (for example, hydrocarbons) at a high temperature and depositing on surfaces of a solid substrate, wherein the substrate is generally a transition metal such as Ni, Ru, etc.

Graphene oxide reduction: This method is the most widely used presently and the most promising to achieve large-scale industrial preparation of graphene, and involves by using graphene oxide as a precursor, removing oxygen-containing groups on surfaces of graphene oxide through thermal reduction or chemical reduction. Although such a method cannot produce perfect graphene, it can restore the intrinsic properties of graphene to a large extent. Also, in contrast to other graphene preparation methods, graphene oxide reduction has abundant raw materials, simple equipment and operation processes, and graphene prepared thereby has great workability, and thus much attention is paid to this method.

Graphene oxide reduction further includes thermal expansion reduction and chemical reduction.

Longitudinally cutting carbon tube: Preparing graphene by using carbon nanotubes as raw materials is a novel method for preparing graphene developed in recent years, and anisotropic ribbon-like graphene is obtained by cutting carbon nanotubes, which is different from sheet-like isotropic graphene obtained by using graphite as raw materials.

As graphite synthesized by the present inventors, it can be prepared by employing any method known in the art. In the present invention, graphene oxide reduction is preferred.

Graphene oxide is a derivative of graphene, and graphene treated with a strong oxidant comprises three elements C, H and O. Similar to graphite, graphene oxide also has a 2-dimensional layer-like structure, and graphene oxide is packed layer by layer through action forces such as inter-layer hydrogen bonding. However, graphene oxide contains a large amount of oxygen-containing groups on its surfaces, so it is highly hydrophilic and is dispersible in water.

Preparation method for graphene oxide: There are three commonly used methods for preparing graphitic oxide presently, i.e., Brodie method, Staudenmaier method and Hummers method, all using a combination of a strong acid and a strong oxidant to treat graphite. A strong protonic acid is introduced into interlayers of graphite, so as to form graphite intercalation compounds, then graphite is oxidized with a strong oxidant to introduce a large amount of hydrophilic oxygen-containing functional groups into the surfaces and edges of graphite, thus forming graphene oxide. Due to the strong hydrophilicity of oxygen-containing groups, graphene oxide can be exfoliated completely and dispersed in the aqueous solution.

In the present invention, graphene oxide is the product of graphite powder after being chemically oxidized and exfoliated. Since graphene oxide has a single atom layer, it can be expanded to tens of micrometers in a lateral direction. Accordingly, its structure spans over typical dimensions of general chemistry and material science. Graphene oxide can be regarded as a non-traditional type of soft material, with the characteristics of polymers, colloids, films, and amphoteric molecules. After oxidation treatment, graphene oxide still maintains the layer-like structure of graphite, but many oxygen functional groups are introduced on each layer of graphene monolith. Among these methods, Hummers method is relatively good in time effectiveness and is relatively safe during the preparation process, and is the most commonly used one at present. After graphite powder is oxidized with potassium permanganate in concentrated sulfuric acid, brown graphite sheets with derived carboxylic acid groups at the edge and primarily phenolic hydroxyl groups and epoxy groups on the plane are obtained. The graphite sheets can be exfoliated into graphene oxide by ultrasonic or high-shear vigorous stirring, and a stable and light brown single-layer graphene oxide suspension is formed in water. Due to the severe functionalization of the conjugated network, graphene oxide sheets are insulative in nature. Presently, there are a variety of new methods for preparing graphene oxide, which can be generally divided into two categories: top-down methods and bottom-up methods. The former has a concept of preparing graphene oxide by splitting flaky graphite, which is represented by the improved methods of the traditional three methods, and further involves splitting (breaking) carbon nanotubes, and so on. The latter is a method of synthesis using various carbon sources, and the specific methods are varied and various.

In the present invention, the oxidized graphene has an oxygen element content of 15 at %-20 at %. As a preferred mode of the present invention, the oxygen element content is 16 at %-18 at %, still more preferably 17 at %.

In the present invention, the oxygen element content may be measured by any method known to those skilled in the art. In the present invention, measurement is carried out mainly by elemental analysis.

Modified Graphene

The modified graphene according to the present invention is often formed by treating graphene to have amino groups on its surfaces.

The manner of the functionalization treatment is not particularly limited in the present invention, and the modified graphene may be prepared by any method known to those skilled in the art, and may also be commercially available.

In a preferred embodiment, the modified graphene according to the present invention is aminated graphene.

In a preferred embodiment, the aminated graphene according to the present invention includes piperazine modified graphene and octadecylamine modified graphene.

In a preferred embodiment, the piperazine modified graphene and the octadecylamine modified graphene according to the present invention have a weight ratio of 1:(2-3).

In a preferred embodiment, the piperazine modified graphene according to the present invention is purchased from Nanjing Xianfeng Nanomaterial Technology Co., Ltd., CAS No. XF005-1. The octadecylamine modified graphene is purchased from Nanjing Xianfeng Nanomaterial Technology Co., Ltd., CAS No. XF005-3.

The inventors during the research found that modifying graphene can form a film on its surfaces, so that adsorption and agglomeration between graphene molecules or between graphene molecules and silicon carbide molecules can be avoided, thus improving the dispersion effect between materials. Also, anchor points are formed inside fibers to absorb the transmitted energy and avoid local crack expansion, thus improving the tear resistant effect. Also, the inventors unexpectedly found that by regulating the use ratio of piperazine modified graphene and octadecylamine modified graphene, the creep resistance and high temperature resistance of UHMWPE fibers can be improved. This is likely because the flexible aliphatic alkane chain on octadecylamine and the ring structure on piperazine form a protective film on surfaces of graphene to prevent it from agglomerating, which is further conducive to forming an interpenetrating network structure within UHMWPE segments, thereby changing the strength and cut resistance of the fibers.

Silicon Carbide

The silicon carbide (SiC) according to the present invention is a binary compound of group IV-IV, which is the only, extremely stable compound among group IV elements. It is formed by the covalent bond of carbon atoms and silicon atoms, and has a diamond-like hexahedral crystal structure. The SiC crystal structure is composed of two densely arranged sub-lattices, i.e., Si atom sub-lattice and C atom sub-lattice, and the latter has a displacement along the principal axis of symmetry which is one fourth of the distance between two adjacent layers of Si atom. The silicon carbide group is centered on one carbon atom, which connects to four Si atoms bonded by a covalent bond. Si atoms are shared by adjacent groups, that is, one Si atom belongs to four such groups. Therefore, the simplest ratio of atoms in each group is 1:1, and the chemical formula is SiC. The minimum distance between Si atoms and C atoms is 0.189 nm, and each Si (or C) atom is surrounded by four C (or Si) atoms, and they are bonded together by oriented and strong tetrahedral $sp^3$ bonds. This structure determines good chemical stability and thermal stability of SiC, and also determines its wide band gap, superior corrosion resistance, superior mechanical property and heat transfer property. Silicon carbide is a hard material, with a Mohs' hardness of up to 9.2-9.5. The typical structure of SiC can be divided into two categories: one is the cubic SiC crystal form of sphalerite structure, collectively referred to as β-SiC; and the other is the large-period structure of hexagonal or rhombohedral structure, typically 6H, 4H, 15R etc., collectively referred to as α-SiC.

The silicon carbide powder according to the present invention includes hexagonal or rhombohedral α-SiC and cubic β-SiC, as well as β-SiC whisker. If the silicon carbide powder is combined with plastics, metals and ceramics to form composite materials, its various properties can be greatly improved. Since its excellent properties such as high thermal stability, high strength and high thermal conductivity, it is widely applied to atomic energy materials, chemical devices, high temperature treatment, electrical and electronic materials, semiconductor field, electric heating elements, and resistors, etc., and can also be applied to abrasive materials, abrasive tools, advanced refractory materials, and fine ceramics.

As for the SiC powder according to the present invention, the crystalline phase is described as follows: SiC crystal nucleus is precipitated successively from raw materials of $SiO_2$ and C by the vapor-liquid-solid mechanism at a high temperature and superposes itself, and finally constantly grows along an ab-axis of the Six squares of SiC and c-axis in the vertical direction, so as to form a hexagonal crystal system. Various topographies such as SiC nanowires or nanorods or nanosheets can be formed, depending on reaction conditions.

In recent years, the preparation methods for silicon carbide nano powders are mainly classified into three categories, solid-phase method, liquid-phase method and gas-phase method.

Carbothermal reduction: A mixture of $SiO_2$ and Si powder is heated at a high temperature to release SiO gas, which is reacted with activated carbon to prepare β-SiC.

Mechanical alloying: Si powder and C powder are mixed at a ratio of n(Si):n(C)=1:1, and grinding ball and the powder are charged in a mill tank filled with hydrogen at a ball-to-powder weight ratio of 40:1. Mechanical ball milling is carried out on a WL-1 planetary ball mill, and SiC powder with an average grain size of 6 nm is prepared after ball milling for 25 hours.

Sol-gel method: With tetraethoxysilane or methyl triethoxysilane as silicon sources, and taking phenolic resin or starch and so on as carbon sources, the resultant gel is carbonized at a temperature of 800° C. in nitrogen to get SiC precursor, which is heated in hydrogen at a temperature of 1550° C., and finally 5 to 20 nm of SiC is obtained.

Polymer pyrolysis: With low-molecular-weight polycarbosilane (LPS) as raw materials, ultrafine SiC powder is prepared by gas-phase pyrolysis.

Modified Silicon Carbide Whisker

The silicon carbide whisker according to the present invention is cubic whisker, belonging to the same crystal form as diamond, and among whiskers that have been synthesized so far, such a silicon carbide whisker is the whisker product with the highest hardness, the highest modulus, the highest tensile strength, and the greatest heat resistance, which can be divided into two categories, α and β crystal forms, wherein β crystal form are superior to α crystal form in properties and have higher hardness (Mohs' hardness is equal to or greater than 9.5), and better roughness and electrical conductivity.

The modified silicon carbide whisker according to the present invention is usually used for treating silicon carbide, so as to improve its dispersion.

In a preferred embodiment, in the modified silicon carbide whisker according to the present invention, the silicon carbide whisker is of β crystal form.

In a preferred embodiment, in the modified silicon carbide whisker according to the present invention, the silicon carbide whisker has a diameter of 100-600 nm and a length of 10-50 μm.

In a preferred embodiment, the silicon carbide whisker according to the present invention is a product purchased from Qinhuangdao Eno High-tech Material Development Co., Ltd., CAS No. SiCW-80, and other products may be preferred, including but not limited to, a product purchased from this company, CAS No. SiCW-90.

In a preferred embodiment, the modified silicon carbide whisker according to the present invention is silicon carbide whisker modified with a silane coupling agent.

Silane Coupling Agent

The silane coupling agent according to the present invention is an organosilicon compound that has two groups with different chemical properties in the molecule. A common silane coupling agent is a hydrolyzable Y-functional group-containing silane coupling agent, with a structural formula of $Y-CH_2SiR_nX_{(3-n)}$, wherein X is a hydrolyzable organic functional group, such as chloro, acetoxy, methoxy, and ethoxy, etc. X is prone to hydrolyze, and the generated silicon hydroxyl is prone to bond with hydroxyl on the surface of an inorganic substance. Herein, Y is a non-hydrolyzable, reactive organic functional group that can react with organics, or an inert organic functional group that does not react with organics, such as vinyl, epoxy, amino, sulfhydryl, thiocyanato, phenyl, or long chain alkyl, etc.

In the present invention, Y is preferably alkyl or amino, that is, the silane coupling agent is selected from one or more of alkyl silane coupling agents and amino silane coupling agents.

In a preferred embodiment, the silane coupling agent according to the present invention is selected from one or more of alkyl silane coupling agents and amino silane coupling agents.

For example, the alkyl silane coupling agent according to the present invention has a general formula of $Y-CH_2Si_nX_{(3-n)}$, wherein Y is alkyl. Examples that can be cited include, but not limited to, 1,2-bis(triethoxysilyl)ethane, 1,2-bis(trimethoxysilyl)ethane, methyltriethoxysilane, methyltrimethoxysilane, propyltriethoxysilane, propyltrimethoxysilane, octyltriethoxysilane, octyltrimethoxysilane, dodecyltriethoxysilane, dodecyltrimethoxysilane, hexadecyltrimethoxysilane, octadecyltrimethoxysilane, dimethyldiethoxysilane, dimethyldimethoxysilane, isooctyltriethoxysilane, methyltriacetoxysilane, methyltris(methylethylketoxime)silane etc.

For example, the amino silane coupling agent according to the present invention has a general formula of $Y-CH_2Si_nX_{(3-n)}$, wherein Y is amino. Examples that can be cited include, but not limited to, γ-aminopropyltrimethoxysilane, γ-aminopropyltriethoxysilane, γ-aminopropyltriethoxysilane, N-(β-aminoethyl)-γ-aminopropylmethyldimethoxysilane, N-β(aminoethyl)-Y-aminopropyltrimethoxysilane, N-(2-aminoethyl)-3-aminopropyltriethoxysilane, γ-aminopropylmethyldiethoxysilane, 3-aminopropylmethyldimethoxysilane, N-n-butyl-3-aminopropyltrimethoxysilane, 3-ureidopropyltrimethoxysilane, bis-[3-(triethoxysilyl)-propyl]-amine, 3-anilinopropyltrimethoxysilane, diethylenetriamine propyltrimethoxysilane, N-(2-aminoethyl)-3-aminopropylmethyldiethoxysilane, 3-ureidopropyltriethoxysilane, bis-[3-(trimethoxysilyl)-propyl]-amine, etc.

In a preferred embodiment, the silane coupling agent according to the present invention is a mixture of an alkyl silane coupling agent and an amino silane coupling agent.

In a preferred embodiment, the alkyl silane coupling agent and the amino silane coupling agent according to the present invention have a weight ratio of (2:3)-(3:2).

In a preferred embodiment, the alkyl silane coupling agent according to the present invention has an alkyl number of 12.

In a preferred embodiment, the silane coupling agent according to the present invention is a mixture of a dodecyl silane coupling agent and 3-aminopropyltrimethoxysilane.

In a preferred embodiment, the dodecyl silane coupling agent according to the present invention is purchased from Nanjing Youpu Chemical Co., Ltd., CAS No. UP-312, and other preferable agents include UP-313. The 3-aminopropyltrimethoxysilane is purchased from Qingdao Hengda Zhongcheng Technology Co., Ltd., CAS No. KH-540.

The silicon carbide whisker modified with the silane coupling agent according to the present invention is prepared by functional group coupling. The reaction can be made by any method known to those skilled in the art.

For example, the method may comprise the following steps: firstly ultrasonically dispersing silicon carbide whisker in a solvent for 30 minutes; adding a silane coupling agent; stirring for 2-6 hours at a controlled temperature of 60-80° C.; and finally drying, to obtain the silicon carbide whisker modified with the silane coupling agent.

The solvent may be a mixture of one or more of water, methanol, ethyl acetate, acetone, N,N-dimethylformamide, N,N-dimethylacetamide, N,N-diethylformamide, tetrahydrofuran, and dimethylsulfoxide.

In a preferred embodiment, in the silicon carbide whisker modified with the silane coupling agent according to the present invention, the silicon carbide whisker and the silane coupling agent have a weight ratio of 1:(0.1-0.5).

In a preferred embodiment, in the silicon carbide whisker modified with the silane coupling agent according to the present invention, the silicon carbide whisker and the silane coupling agent have a weight ratio of 1:(0.2-0.4).

During the research, the application inventors found that, adding nano silicon carbide can improve the cut resistance of UHMWPE fibers, but nano silicon carbide is prone to agglomerate during the gel spinning process, resulting in poor dispersion. Thus, the inventors use silicon carbide whisker modified with a silane coupling agent. Since the surface of nano silicon carbide is prone to interact with water in the air and carry hydroxyl groups, which participate in the hydrolysis of the silane coupling agent in the above reaction process, they are bonded together by chemical bonds to obtain the modified silicon carbide material. On the one hand, the action force between silicon carbide whiskers is weakened after modification, and agglomeration of whiskers are avoided, thereby improving the dispersion of silicon carbide in UHMWPE; on the other hand, the silicon carbide whisker dispersed in UHMWPE can absorb energy transferred from outside to improve the strength and modulus, thereby improving the strength, cut resistance and safety of UHMWPE fibers. During the research, the inventors unexpectedly found by regulating silicon carbide whisker that when the silicon carbide whisker has a diameter of 100-600 nm and a length of 10-50 μm, the strength and cut resistance of fibers can be further improved greatly. The inventors speculate that this is possibly because under the premise of good dispersion, nano silicon carbide with a certain diameter and length will easily form a uniform and regular fibrous crystal nucleus during the extraction, drawing and heat treatment of UHMPWE fibers, which fibrous crystal nucleus can effectively facilitate UHMWPE segments to orient along it, and grow into an orderly arranged crystal structure on its surface, such that not only the heat resistance, modulus and strength of UHMPWE fibers are improved, but also the cut resistance of the fibers are improved. In addition, the inventors also found that the product of the present invention is not only excellent in strength and cutting resistance, but also excellent in creep resistance. More importantly, silicon carbide in this product is wrapped to avoid direct contact with the human body, which is safer. The inventors speculate that this may be because when the present invention uses an alkyl long-chain silane coupling agent, the long fatty chain and the UHMWPE molecular chain are easy to interpenetrate and entangle with each other due to the small difference in polarity and cohesive-energy density therebetween, thereby improving the action force between silicon carbide and UHMWPE. As for UHMWPE fiber materials, since molecule chains are all non-polar alkyl chains, and actions between segments primarily depend on molecular entanglement and cohesive energy, creeping of the materials may occur in use due to de-entanglement or stress relaxation and the like. When a certain amount of an amino-containing silane coupling agent is added, a "protective layer" can be formed on the surface of silicon carbide, thereby improving the dispersion, avoiding the direct contact with the human body and guaranteeing the safety, and also, hydrogen bonding can be generated between amino groups on the surface of silicon carbide, so as to increase the action force between UHMWPE molecule chains, and increase the energy required for de-entanglement and stress relaxation, thereby improving the creep resistance of fibers. The modified graphene and the modified silicon carbide are dispersed uniformly within UHMWPE molecule chains, and an interpenetrating network structure is formed by action forces such as inter-molecular hydrogen bonding, thus further improving the overall performance of UHMWPE fibers.

Ultra-High Molecular Weight Polyethylene

The ultra-high molecular weight polyethylene used in the present invention uses ethylene as a major component (which has the highest mol % among all the co-polymerized components), for example, ethylene homopolymers, and copolymers of ethylene as a major component and other monomers copolymerizable with ethylene, etc. Examples of other monomers copolymerizable with ethylene include α-olefins having 3 or more carbon atoms. Examples of α-olefins having 3 or more carbon atoms may include propylene, 1-butene, isobutene, 1-pentene, 2-methyl-1-butene, 3-methyl-1-butene, 1-hexene, 3-methyl-1-pentene, 4-methyl-1-pentene, 1-heptene, 1-octene, 1-decene, 1-dodecene, 1-tetradecene, 1-hexadecene, 1-octadecene, and 1-eicosylene, etc.

Among them, considering from economic aspects, ethylene homopolymers or copolymers of ethylene as a major component and the α-olefins above are preferred, wherein ethylene makes up more than 80 mol % of the polymer, preferably more than 90 mol %, more preferably more than 99 mol %.

Ultra-high molecular weight polyethylene is a thermoplastic engineering plastic of a linear structure, and has a series of excellent properties that are dramatically superior to general high-density polyethylene, such as tensile strength, wear resistance, impact resistance, self-lubrication, noise-canceling property and superior chemical resistance, thermal properties, and non-viscosity, etc.

In a preferred embodiment, the ultra-high molecular weight polyethylene according to the present invention has a weight-average molecular weight of 1-4 million.

In a preferred embodiment, the ultra-high molecular weight polyethylene according to the present invention has a weight-average molecular weight of 2-2.4 million.

A weight-average molecular weight is a value after polystyrene conversion based on measurement by gel permeation chromatography (hereinafter, abbreviated as "GPC"). GPC is carried out under common conditions in the art, for example, the following conditions.

Column: The columns below are connected in series for use.

"TSKgelG5000" (7.8 mmI.D.×30 cm)×1
"TSKgelG4000" (7.8 mmI.D.×30 cm)×1
"TSKgelG3000" (7.8 mmI.D.×30 cm)×1
"TSKgelG2000" (7.8 mmI.D.×30 cm)×1

Detector: RI (Differential Refractometer); Column Temperature: 40° C.; Eluant: tetrahydrofuran (THF); Flow Rate: 1.0 mL/min; Injection Volume: 100 μL (tetrahydrofuran solution with a sample concentration of 4 mg/mL).

In the present invention, the ultra-high molecular weight polyethylene may be commercially available, and may also be prepared by the methods known to those skilled in the art.

As a commercially available ultra-high molecular weight polyethylene, it is purchased from Yuyao Jiuding Chemical Material Co., Ltd.

As a synthesized ultra-high molecular weight polyethylene, it is prepared as follows: preparation raw materials (ethylene and/or α-olefin), hydrogen and a catalyst are added continuously into a polymerization reactor, and slurry polymerization is performed under the conditions of 80° C.

and 0.98 MPa for 4 hours, wherein heat generated from polymerization is removed by jacket cooling of the polymerization kettle and external gas circulation.

Cut Resistant and Creep Resistant Fiber

The present invention provides a cut resistant and creep resistant fiber, which is prepared from the foregoing ultra-high molecular weight polyethylene composition.

The method for preparing the cut resistant and creep resistant fiber according to the present invention comprises the following steps:
(1) mixing silicon carbide and ultra-high molecular weight polyethylene uniformly;
(2) high-shear stirring the mixture in the step (1) by an emulsifier, to obtain a spinning solution;
(3) spinning the spinning solution, followed by extraction and thermal drawing, to obtain the fiber.

That is to say, the silicon carbide whisker is firstly ultrasonically dispersed in deionized water for 30 minutes, a silane coupling agent is added, the mixture is stirred for 2-6 hours at a controlled temperature of 60-80° C., and finally the product is dried to obtain silicon carbide whisker modified with the silane coupling agent.

The silicon carbide whisker modified with the silane coupling agent is dispersed in ultra-high molecular weight polyethylene powder by means of high-shear blending, and the prepared powder premix is ultrasonically dispersed uniformly in mineral oil; the mineral oil mixture is slowly heated in a reaction kettle with stirring and shearing, until a uniform solution is formed; and the mixed uniformly solution is spun, and then extracted and drawn, to obtain the composite fiber of the present invention.

The preparation method for ultra-high molecular weight polyethylene spinning may be melt spinning, solid state extrusion, ultradrawing or partial drawing, surface crystal growth, and gel spinning.

Gel spinning process has great adaptability. In addition to the fineness and number of yarns, its mechanical property can be adjusted in a wider range if required. Other properties such as electrical conductivity, bond strength and flame retardancy can be controlled by additives. Dye or other carriers may be added. Among the spinning methods above, melt spinning and gel spinning have achieved industrial production, and gel spinning is the most promising, as the prepared fibers have the highest fiber strength and modulus.

Gel Spinning

Gel spinning includes the following steps: an ultra-high molecular weight polyethylene composition is dissolved in a solvent, cooled and solidified to obtain an undrawn gel yarn containing the solvent; extraction is further performed to obtain an undrawn gel yarn containing an extracting agent; and finally, heating and drawing are performed.

Solvents commonly used for dissolving ultra-high molecular weight polyethylene include kerosene, paraffin, paraffin oil-based paraffinic solvents, and decalin.

Ultra-high molecular weight polyethylene is dissolved in a solvent to prepare a semi-dilute solution, wherein the semi-dilute solution has a concentration of 0.5-10%, and more preferably 3-5%.

The solvent is removed from the gel yarn. It is essential to remove the solvent contained in the gel yarn before drawing, which is beneficial to the stability during drawing, and can improve the effectiveness of drawing. If a large amount of the solvent is contained in the gel yarn, then during the drawing, due to the plasticizing effect of the solvent, there is a relative slipping between large molecules, which reduces the effectiveness of drawing; meanwhile, due to the existence of the solvent, the drawing ratio of the gel yarn is greatly affected by the solvent content, resulting in reduction in stability of drawing. For a solvent with a low boiling point, the solvent is removed primarily by drying; and for a solvent with a high boiling point, the solvent is removed by extraction.

The gel yarn is drawn more than 20 times by ultra-drawing.

In a preferred embodiment, the modified graphene according to the present invention has a content of 0.5-5 wt % of the ultra-high molecular weight polyethylene.

In a preferred embodiment, the modified graphene according to the present invention has a content of 1-3 wt % of the ultra-high molecular weight polyethylene.

In a preferred embodiment, the modified graphene according to the present invention has a content of 2.2 wt % of the ultra-high molecular weight polyethylene.

In a preferred embodiment, the modified silicon carbide whisker according to the present invention has a content of 0.5-5 wt % of the ultra-high molecular weight polyethylene.

In a preferred embodiment, the modified silicon carbide whisker according to the present invention has a content of 2-4 wt % of the ultra-high molecular weight polyethylene.

In a preferred embodiment, the modified silicon carbide whisker according to the present invention has a content of 3 wt % of the ultra-high molecular weight polyethylene.

Herein, the wt % is a percentage by weight.

In a preferred embodiment, the preparation process for the cut resistant and creep resistant fiber according to the present invention is specifically as follows:
(1) the silicon carbide whisker modified with the silane coupling agent prepared above is dispersed in ultra-high molecular weight polyethylene powder by means of high-shear blending, and the prepared powder premix is ultrasonically dispersed uniformly in mineral oil;
(2) the mineral oil mixture is slowly heated in a reaction kettle with stirring and shearing, until a uniform solution is formed, wherein the speed of the high-shear stirring is 1000-3000 r/min and the stirring time is 2-4 hours, and a spinning solution with a mass concentration of 3-5% is obtained after mixing uniformly;
(3) the spinning solution is spun by gel spinning and is subjected to extraction and thermal drawing, to obtain a composite fiber, wherein the spinning temperature is 230-280° C.

Another aspect of the present invention provides a finished product manufactured from the cut resistant and creep resistant fiber that is prepared from the ultra-high molecular weight polyethylene composition, wherein the finished product may be fabric, for example, cut resistant gloves, clothes, cloth, etc.

The present invention is described in detail by way of examples below. All the raw materials are commercially available, unless otherwise stated.

EXAMPLES

Example 1

Example 1 provides a cut resistant and creep resistant fiber, which is prepared from an ultra-high molecular weight polyethylene composition comprising the following components: modified graphene, modified silicon carbide whisker, and ultra-high molecular weight polyethylene.

The modified graphene is a mixture of piperazine modified graphene and octadecylamine modified graphene. The piperazine modified graphene and the octadecylamine modified graphene have a weight ratio of 1:2. The modified graphene has a content of 0.5 wt % of the ultra-high molecular weight polyethylene.

The modified silicon carbide whisker is silicon carbide whisker modified with a silane coupling agent. The modified silicon carbide whisker has a content of 5 wt % of the ultra-high molecular weight polyethylene.

The ultra-high molecular weight polyethylene has a weight-average molecular weight of 2 million, and is purchased from Yuyao Jiuding Chemical Material Co., Ltd.

The preparation method for the silicon carbide whisker modified with the silane coupling agent comprises the following steps: firstly ultrasonically dispersing the silicon carbide whisker in deionized water for 30 minutes; adding the silane coupling agent; stirring for 5 hours at a controlled temperature of 70° C.; and finally drying, to obtain the silicon carbide whisker modified with the silane coupling agent.

In the silicon carbide whisker modified with the silane coupling agent, the silicon carbide whisker and the silane coupling agent have a weight ratio of 1:0.1; the silane coupling agent is a mixture of dodecylsilane coupling agent and 3-aminopropyltrimethoxysilane, and the dodecylsilane coupling agent and the 3-aminopropyltrimethoxysilane have a weight ratio of 2:3; the dodecylsilane coupling agent is purchased from Nanjing Youpu Chemical Co., Ltd., CAS No. UP-312; the 3-aminopropyltrimethoxysilane is purchased from Qingdao Hengda Zhongcheng Technology Co., Ltd., CAS No. KH-540.

In the silicon carbide whisker modified with the silane coupling agent, the silicon carbide whisker is of β crystal form and has a diameter of 200-500 nm and a length of 10-50 μm, which is purchased from Qinhuangdao Eno High-tech Material Development Co., Ltd., CAS No. SiCW-80.

The preparation process for the cut resistant and creep resistant fiber is specifically as follows:
(1) the silicon carbide whisker modified with the silane coupling agent prepared above is dispersed in ultra-high molecular weight polyethylene powder by means of high-shear blending, and the prepared powder premix is ultrasonically dispersed uniformly in mineral oil;
(2) the mineral oil mixture is slowly heated in a reaction kettle with stirring and shearing, until a uniform solution is formed, wherein the speed of the high-shear stirring is 1000 r/min and the stirring time is 4 hours, and a spinning solution with a mass concentration of 3% is obtained after mixing uniformly;
(3) the spinning solution is spun by gel spinning and is subjected to extraction and thermal drawing, to obtain a composite fiber, wherein the spinning temperature is 230° C.

Example 2

Example 2 provides a cut resistant and creep resistant fiber, which is prepared from an ultra-high molecular weight polyethylene composition comprising the following components: modified graphene, modified silicon carbide whisker, and ultra-high molecular weight polyethylene.

The modified graphene is a mixture of piperazine modified graphene and octadecylamine modified graphene. The piperazine modified graphene and the octadecylamine modified graphene have a weight ratio of 1:3. The modified graphene has a content of 5 wt % of the ultra-high molecular weight polyethylene.

The modified silicon carbide whisker is silicon carbide whisker modified with a silane coupling agent. The modified silicon carbide whisker has a content of 0.5 wt % of the ultra-high molecular weight polyethylene.

The ultra-high molecular weight polyethylene has a weight-average molecular weight of 2.1 million, and is purchased from Shanghai Chuhao Import and Export Co., Ltd.

The preparation method for the silicon carbide whisker modified with the silane coupling agent comprises the following steps: firstly ultrasonically dispersing the silicon carbide whisker in deionized water for 30 minutes; adding the silane coupling agent; stirring for 5 hours at a controlled temperature of 70° C.; and finally drying, to obtain the silicon carbide whisker modified with the silane coupling agent.

In the silicon carbide whisker modified with the silane coupling agent, the silicon carbide whisker and the silane coupling agent have a weight ratio of 1:0.3; the silane coupling agent is a mixture of dodecylsilane coupling agent and 3-aminopropyltrimethoxysilane, and the dodecylsilane coupling agent and the 3-aminopropyltrimethoxysilane have a weight ratio of 3:2; the dodecylsilane coupling agent is purchased from Nanjing Youpu Chemical Co., Ltd., CAS No. UP-313; the 3-aminopropyltrimethoxysilane is purchased from Qingdao Hengda Zhongcheng Technology Co., Ltd., CAS No. KH-540.

In the silicon carbide whisker modified with the silane coupling agent, the silicon carbide whisker is of β crystal form and has a diameter of 200-500 nm and a length of 10-50 μm, which is purchased from Qinhuangdao Eno High-tech Material Development Co., Ltd., CAS No. SiCW-80.

The preparation process for the cut resistant and creep resistant fiber is specifically as follows:
(1) the silicon carbide whisker modified with the silane coupling agent prepared above is dispersed in ultra-high molecular weight polyethylene powder by means of high-shear blending, and the prepared powder premix is ultrasonically dispersed uniformly in mineral oil;
(2) the mineral oil mixture is slowly heated in a reaction kettle with stirring and shearing, until a uniform solution is formed, wherein the speed of the high-shear stirring is 3000 r/min and the stirring time is 2 hours, and a spinning solution with a mass concentration of 5% is obtained after mixing uniformly;
(3) the spinning solution is spun by gel spinning and is subjected to extraction and thermal drawing, to obtain a composite fiber, wherein the spinning temperature is 280° C.

Example 3

Example 3 provides a cut resistant and creep resistant fiber, which is prepared from an ultra-high molecular weight polyethylene composition comprising the following components: modified graphene, modified silicon carbide whisker, and ultra-high molecular weight polyethylene.

The modified graphene is a mixture of piperazine modified graphene and octadecylamine modified graphene. The piperazine modified graphene and the octadecylamine modified graphene have a weight ratio of 1:2.2. The modified graphene has a content of 1 wt % of the ultra-high molecular weight polyethylene.

The modified silicon carbide whisker is silicon carbide whisker modified with a silane coupling agent. The modified silicon carbide whisker has a content of 4 wt % of the ultra-high molecular weight polyethylene.

The ultra-high molecular weight polyethylene has a weight-average molecular weight of 2.4 million, and is purchased from Shanghai Chuhao Import and Export Co., Ltd.

The preparation method for the silicon carbide whisker modified with the silane coupling agent comprises the following steps: firstly ultrasonically dispersing the silicon carbide whisker in deionized water for 30 minutes; adding the silane coupling agent; stirring for 5 hours at a controlled temperature of 70° C.; and finally drying, to obtain the silicon carbide whisker modified with the silane coupling agent.

In the silicon carbide whisker modified with the silane coupling agent, the silicon carbide whisker and the silane coupling agent have a weight ratio of 1:0.2; the silane coupling agent is a mixture of dodecylsilane coupling agent and 3-aminopropyltrimethoxysilane, and the dodecylsilane coupling agent and the 3-aminopropyltrimethoxysilane have a weight ratio of 1:1; the dodecylsilane coupling agent is purchased from Nanjing Youpu Chemical Co., Ltd., CAS No. UP-312; the 3-aminopropyltrimethoxysilane is purchased from Qingdao Hengda Zhongcheng Technology Co., Ltd., CAS No. KH-540.

In the silicon carbide whisker modified with the silane coupling agent, the silicon carbide whisker is of β crystal form and has a diameter of 100-600 nm and a length of 10-50 µm, which is purchased from Qinhuangdao Eno High-tech Material Development Co., Ltd., CAS No. SiCW-90.

The preparation process for the cut resistant and creep resistant fiber is specifically as follows:

(1) the silicon carbide whisker modified with the silane coupling agent prepared above is dispersed in ultra-high molecular weight polyethylene powder by means of high-shear blending, and the prepared powder pre-mix is ultrasonically dispersed uniformly in mineral oil;

(2) the mineral oil mixture is slowly heated in a reaction kettle with stirring and shearing, until a uniform solution is formed, wherein the speed of the high-shear stirring is 2000 r/min and the stirring time is 3 hours, and a spinning solution with a mass concentration of 4% is obtained after mixing uniformly;

(3) the spinning solution is spun by gel spinning and is subjected to extraction and thermal drawing, to obtain a composite fiber, wherein the spinning temperature is 250° C.

Example 4

Example 4 provides a cut resistant and creep resistant fiber, which is prepared from an ultra-high molecular weight polyethylene composition comprising the following components: modified graphene, modified silicon carbide whisker, and ultra-high molecular weight polyethylene.

The modified graphene is a mixture of piperazine modified graphene and octadecylamine modified graphene. The piperazine modified graphene and the octadecylamine modified graphene have a weight ratio of 1:2.8. The modified graphene has a content of 3 wt % of the ultra-high molecular weight polyethylene.

The modified silicon carbide whisker is silicon carbide whisker modified with a silane coupling agent. The modified silicon carbide whisker has a content of 2 wt % of the ultra-high molecular weight polyethylene.

The ultra-high molecular weight polyethylene has a weight-average molecular weight of 2.1 million, and is purchased from Shanghai Chuhao Import and Export Co., Ltd.

The preparation method for the silicon carbide whisker modified with the silane coupling agent comprises the following steps: firstly ultrasonically dispersing the silicon carbide whisker in deionized water for 30 minutes; adding the silane coupling agent; stirring for 5 hours at a controlled temperature of 70° C.; and finally drying, to obtain the silicon carbide whisker modified with the silane coupling agent.

In the silicon carbide whisker modified with the silane coupling agent, the silicon carbide whisker and the silane coupling agent have a weight ratio of 1:0.4; the silane coupling agent is a mixture of dodecylsilane coupling agent and 3-aminopropyltrimethoxysilane, and the dodecylsilane coupling agent and the 3-aminopropyltrimethoxysilane have a weight ratio of 1:1.2; the dodecylsilane coupling agent is purchased from Nanjing Youpu Chemical Co., Ltd., CAS No. UP-312; the 3-aminopropyltrimethoxysilane is purchased from Qingdao Hengda Zhongcheng Technology Co., Ltd., CAS No. KH-540.

In the silicon carbide whisker modified with the silane coupling agent, the silicon carbide whisker is of β crystal form and has a diameter of 100-600 nm and a length of 10-50 µm, which is purchased from Qinhuangdao Eno High-tech Material Development Co., Ltd., CAS No. SiCW-90.

The preparation process for the cut resistant and creep resistant fiber is similar to that of Example 3.

Example 5

Example 5 provides a cut resistant and creep resistant fiber, which is prepared from an ultra-high molecular weight polyethylene composition comprising the following components: modified graphene, modified silicon carbide whisker, and ultra-high molecular weight polyethylene.

The modified graphene is a mixture of piperazine modified graphene and octadecylamine modified graphene. The piperazine modified graphene and the octadecylamine modified graphene have a weight ratio of 1:2.5. The modified graphene has a content of 2.2 wt % of the ultra-high molecular weight polyethylene.

The modified silicon carbide whisker is silicon carbide whisker modified with a silane coupling agent. The modified silicon carbide whisker has a content of 3 wt % of the ultra-high molecular weight polyethylene.

The ultra-high molecular weight polyethylene has a weight-average molecular weight of 2.1 million, and is purchased from Shanghai Chuhao Import and Export Co., Ltd.

The preparation method for the silicon carbide whisker modified with the silane coupling agent comprises the following steps: firstly ultrasonically dispersing the silicon carbide whisker in deionized water for 30 minutes; adding the silane coupling agent; stirring for 5 hours at a controlled temperature of 70° C.; and finally drying, to obtain the silicon carbide whisker modified with the silane coupling agent.

In the silicon carbide whisker modified with the silane coupling agent, the silicon carbide whisker and the silane coupling agent have a weight ratio of 1:0.3; the silane coupling agent is a mixture of dodecylsilane coupling agent and 3-aminopropyltrimethoxysilane, and the dodecylsilane coupling agent and the 3-aminopropyltrimethoxysilane have a weight ratio of 1:1.6; the dodecylsilane coupling agent is purchased from Nanjing Youpu Chemical Co., Ltd., CAS No. UP-312; the 3-aminopropyltrimethoxysilane is purchased from Qingdao Hengda Zhongcheng Technology Co., Ltd., CAS No. KH-540.

In the silicon carbide whisker modified with the silane coupling agent, the silicon carbide whisker is of β crystal form and has a diameter of 200-500 nm and a length of 10-50 μm, which is purchased from Qinhuangdao Eno High-tech Material Development Co., Ltd., CAS No. SiCW-80.

The preparation process for the cut resistant and creep resistant fiber is similar to that of Example 3.

Comparative Example 1

Comparative example 1 provides a cut resistant and creep resistant fiber, which is prepared from an ultra-high molecular weight polyethylene composition comprising the following components: modified graphene, modified silicon carbide whisker, and ultra-high molecular weight polyethylene.

Comparative example 1 is different from Example 5 in that, the modified graphene has a content of 0.1 wt % of the ultra-high molecular weight polyethylene.

Comparative Example 2

Comparative example 2 provides a cut resistant and creep resistant fiber, which is prepared from an ultra-high molecular weight polyethylene composition comprising the following components: modified graphene, modified silicon carbide whisker, and ultra-high molecular weight polyethylene.

Comparative example 2 is different from Example 5 in that, the modified graphene has a content of 20 wt % of the ultra-high molecular weight polyethylene.

Comparative Example 3

Comparative example 3 provides a cut resistant and creep resistant fiber, which is prepared from an ultra-high molecular weight polyethylene composition comprising the following components: modified graphene, modified silicon carbide whisker, and ultra-high molecular weight polyethylene.

Comparative example 3 is different from Example 5 in that, the piperazine modified graphene and the octadecylamine modified graphene have a weight ratio of 1:0.2.

Comparative Example 4

Comparative example 4 provides a cut resistant and creep resistant fiber, which is prepared from an ultra-high molecular weight polyethylene composition comprising the following components: modified graphene, modified silicon carbide whisker, and ultra-high molecular weight polyethylene.

Comparative example 4 is different from Example 5 in that, the piperazine modified graphene and the octadecylamine modified graphene have a weight ratio of 1:15.

Comparative Example 5

Comparative example 5 provides a cut resistant and creep resistant fiber, which is prepared from an ultra-high molecular weight polyethylene composition comprising the following components: modified graphene, modified silicon carbide whisker, and ultra-high molecular weight polyethylene.

Comparative example 5 is different from Example 5 in that, the modified silicon carbide whisker has a content of 0.1 wt % of the ultra-high molecular weight polyethylene.

Comparative Example 6

Comparative example 6 provides a cut resistant and creep resistant fiber, which is prepared from an ultra-high molecular weight polyethylene composition comprising the following components: modified graphene, modified silicon carbide whisker, and ultra-high molecular weight polyethylene.

Comparative example 6 is different from Example 5 in that, the modified silicon carbide whisker has a content of 20 wt % of the ultra-high molecular weight polyethylene.

Comparative Example 7

Comparative example 7 provides a cut resistant and creep resistant fiber, which is prepared from an ultra-high molecular weight polyethylene composition comprising the following components: modified graphene, modified silicon carbide whisker, and ultra-high molecular weight polyethylene.

Comparative example 7 is different from Example 5 in that, the ultra-high molecular weight polyethylene has a weight-average molecular weight of 0.9 million, and is purchased from Yuyao Jiuding Chemical Material Co., Ltd.

Comparative Example 8

Comparative example 8 provides a cut resistant and creep resistant fiber, which is prepared from an ultra-high molecular weight polyethylene composition comprising the following components: modified graphene, modified silicon carbide whisker, and ultra-high molecular weight polyethylene.

Comparative example 8 is different from Example 5 in that, the ultra-high molecular weight polyethylene has a weight-average molecular weight of 5 million, and is purchased from Yuyao Jiuding Chemical Material Co., Ltd.

Comparative Example 9

Comparative example 9 provides a cut resistant and creep resistant fiber, which is prepared from an ultra-high molecular weight polyethylene composition comprising the following components: modified graphene, modified silicon carbide whisker, and ultra-high molecular weight polyethylene.

Comparative example 9 is different from Example 5 in that, in the silicon carbide whisker modified with the silane coupling agent, the silicon carbide whisker and the silane coupling agent have a weight ratio of 1:0.02.

Comparative Example 10

Comparative example 10 provides a cut resistant and creep resistant fiber, which is prepared from an ultra-high molecular weight polyethylene composition comprising the following components: modified graphene, modified silicon carbide whisker, and ultra-high molecular weight polyethylene.

Comparative example 10 is different from Example 5 in that, in the silicon carbide whisker modified with the silane coupling agent, the silicon carbide whisker and the silane coupling agent have a weight ratio of 1:2.

Comparative Example 11

Comparative example 11 provides a cut resistant and creep resistant fiber, which is prepared from an ultra-high molecular weight polyethylene composition comprising the following components: modified graphene, modified silicon carbide whisker, and ultra-high molecular weight polyethylene.

Comparative example 11 is different from Example 5 in that, the dodecylsilane coupling agent and the 3-aminopropyltrimethoxysilane have a weight ratio of 1:5.

Comparative Example 12

Comparative example 12 provides a cut resistant and creep resistant fiber, which is prepared from an ultra-high molecular weight polyethylene composition comprising the following components: modified graphene, modified silicon carbide whisker, and ultra-high molecular weight polyethylene.

Comparative example 12 is different from Example 5 in that, the dodecylsilane coupling agent and the 3-aminopropyltrimethoxysilane have a weight ratio of 5:1.

Comparative Example 13

Comparative example 13 provides a cut resistant and creep resistant fiber, which is prepared from an ultra-high molecular weight polyethylene composition comprising the following components: modified graphene, modified silicon carbide whisker, and ultra-high molecular weight polyethylene.

Comparative example 13 is different from Example 5 in that, in the silicon carbide whisker modified with the silane coupling agent, the silicon carbide whisker is of β crystal form and has a diameter of 100-600 nm and a length of 100 μm, which is purchased from Qinhuangdao Eno High-tech Material Development Co., Ltd., CAS No. SiCW-98.

Comparative Example 14

Comparative example 14 provides a cut resistant and creep resistant fiber, which is prepared from an ultra-high molecular weight polyethylene composition comprising the following components: modified graphene, modified silicon carbide whisker, and ultra-high molecular weight polyethylene.

Comparative example 14 is different from Example 5 in that, the silane coupling agent is a mixture of octadecyl silane coupling agent and 3-aminopropyltrimethoxysilane; the octadecyl silane coupling agent is purchased from Nanjing Youpu Chemical Co., Ltd., CAS No. UP-318.

Comparative Example 15

Comparative example 15 provides a cut resistant and creep resistant fiber, which is prepared from an ultra-high molecular weight polyethylene composition comprising the following components: modified graphene, modified silicon carbide whisker, and ultra-high molecular weight polyethylene.

Comparative example 15 is different from Example 5 in that, the silane coupling agent is a mixture of methyl silane coupling agent and 3-aminopropyltrimethoxysilane; the methyl silane coupling agent is purchased from Nanjing Youpu Chemical Co., Ltd., CAS No. UP-302.

Performance Evaluation

1. Cut Resistance Test on the Product:

The tests can be carried out according to National Standard GB24541-2009 or European Standard EN388. According to European Standard EN388, the cut resistance of yarns is tested by using a cut resistance tester, which is a testing machine produced by Sodemat manufacturer according to European Standard EN388. A test sample is placed on a table of the cut resistance tester, with aluminum foil underneath, and is moved horizontally. A spare circular blade is placed on the sample and rotated while advancing, and the advancing direction and the moving direction of the test sample are reversed. Once the test sample is completely cut off, the circular blade contacts with the aluminum foil, and thus a circuit is energized. At this time, the circuit informs a counter that the cutting is finished. The counter is always recording throughout the process, so the cut resistance data of the test sample can be obtained. After the testing, the cut resistance level is evaluated by comparing with the cutting level of a standard sample (a 200 g/m² plain cotton fabric) under the same conditions. The test starts from the standard sample, and the test sample and the standard sample are alternatively tested. After the test sample has been tested for 3 times, the standard sample is finally tested the fourth time. This round of testing is ended.

The evaluation value is calculated according to the following equation and is referred to as a cut resistance index:

N=(Counter Reading of Standard Sample Before Test Sample Testing+Counter Reading of Standard Sample After Test Sample Testing)/2;

Index=(Counter Reading of Test Sample+N)/N

Index classification

| Index | Cut Resistance Level |
| --- | --- |
| 2.0-2.5 | 1 |
| 2.5-5.0 | 2 |
| 5.0-10 | 3 |
| 10.0-20.0 | 4 |
| >20.0 | 5 |

In addition, the circular blade used in the tests is a Rotary Cutter L-shaped produced by OLFA, with a diameter of 45 mm, a material of SKS-7 tungsten steel, and a blade thickness of 0.3 mm.

2. Tear Strength Test: The tests are carried out according to JB/T1040-92.

3. Creep Resistance Test: Test conditions for creep elongation: the temperature is 20±2° C. and the relative humidity is 63±3%, the applied stress is 50% of the fiber breaking strength, and the creep time is 1d.

TABLE 1

| | Cut | Tear Strength | Creep Resistance (%) |
| --- | --- | --- | --- |
| Example 1 | 5 | 27.52 | 1.416 |
| Example 2 | 5 | 28.35 | 1.432 |
| Example 3 | 5 | 29.87 | 1.284 |
| Example 4 | 5 | 29.58 | 1.029 |
| Example 5 | 5 | 31.67 | 0.916 |
| Comparative example 1 | 2 | 19.82 | 2.646 |
| Comparative example 2 | 4 | 30.15 | 2.429 |
| Comparative example 3 | 2 | 25.35 | 1.525 |
| Comparative example 4 | 3 | 23.55 | 5.518 |
| Comparative example 5 | 2 | 19.43 | 6.543 |
| Comparative example 6 | 4 | 28.22 | 1.416 |
| Comparative example 7 | 2 | 25.91 | 1.517 |
| Comparative example 8 | 3 | 24.61 | 5.587 |
| Comparative example 9 | 2 | 21.38 | 4.942 |
| Comparative example 10 | 3 | 26.48 | 6.514 |
| Comparative example 11 | 2 | 24.61 | 1.548 |
| Comparative example 12 | 2 | 26.18 | 9.624 |
| Comparative example 13 | 3 | 22.31 | 2.056 |
| Comparative example 14 | 3 | 19.67 | 6.314 |
| Comparative example 15 | 2 | 22.46 | 8.464 |

What is claimed is:

1. An ultra-high molecular weight polyethylene composition, comprising the following components: modified graphene, modified silicon carbide whisker, and ultra-high molecular weight polyethylene, wherein the modified silicon carbide whisker is silicon carbide whisker modified with a silane coupling agent, and wherein the modified graphene comprises piperazine modified graphene and octadecylamine modified graphene.

2. The ultra-high molecular weight polyethylene composition according to claim 1, wherein the modified graphene has a content of 0.5-5 wt % of the ultra-high molecular weight polyethylene.

3. The ultra-high molecular weight polyethylene composition according to claim 1, wherein the modified silicon carbide whisker has a content of 0.5-5 wt % of the ultra-high molecular weight polyethylene.

4. The ultra-high molecular weight polyethylene composition according to claim 1, wherein the ultra-high molecular weight polyethylene has a weight-average molecular weight of 2-2.4 million.

5. The ultra-high molecular weight polyethylene composition according to claim 1, wherein in the silicon carbide whisker modified with the silane coupling agent, the silicon carbide whisker and the silane coupling agent have a weight ratio of 1:(0.1-0.5).

6. A cut resistant and creep resistant fiber, prepared from the ultra-high molecular weight polyethylene composition according to claim 1.

7. A method for preparing the cut resistant and creep resistant fiber according to claim 6, comprising the following steps:
(1) mixing modified graphene, modified silicon carbide whisker and ultra-high molecular weight polyethylene uniformly;
(2) high-shear stirring the mixture in the step (1) by an emulsifier, to obtain a spinning solution;
(3) spinning the spinning solution, followed by extraction and thermal drawing, to obtain the fiber.

8. A cut resistant and creep resistant fiber, prepared from the ultra-high molecular weight polyethylene composition according to claim 2.

9. A cut resistant and creep resistant fiber, prepared from the ultra-high molecular weight polyethylene composition according to claim 3.

10. A cut resistant and creep resistant fiber, prepared from the ultra-high molecular weight polyethylene composition according to claim 4.

11. A cut resistant and creep resistant fiber, prepared from the ultra-high molecular weight polyethylene composition according to claim 8.

* * * * *